(12) United States Patent
Ruck et al.

(10) Patent No.: US 10,488,171 B2
(45) Date of Patent: Nov. 26, 2019

(54) PROBE HEAD FOR A COORDINATE MEASURING MACHINE

(71) Applicant: CARL ZEISS INDUSTRIELLE MESSTECHNIK GMBH, Oberkochen (DE)

(72) Inventors: Otto Ruck, Pfahlheim (DE); Peter Mueller, Oberndorf a/N (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 396 days.

(21) Appl. No.: 15/419,503

(22) Filed: Jan. 30, 2017

(65) Prior Publication Data

US 2017/0138718 A1    May 18, 2017

Related U.S. Application Data

(63) Continuation of application No. PCT/EP2014/066556, filed on Jul. 31, 2014.

(51) Int. Cl.
*G01B 5/012* (2006.01)
*G01B 5/016* (2006.01)
(Continued)

(52) U.S. Cl.
CPC ............ *G01B 5/012* (2013.01); *G01B 5/0014* (2013.01); *G01B 5/016* (2013.01); *G01B 11/007* (2013.01)

(58) Field of Classification Search
CPC ................................ G01B 5/012; G01B 5/016
(Continued)

(56) References Cited

U.S. PATENT DOCUMENTS 3,102,343 A * 9/1963 Plank ................... G01B 3/00
                                                                33/642
3,914,869 A * 10/1975 Merz .................... G01B 7/012
                                                                33/642
(Continued)

FOREIGN PATENT DOCUMENTS

DE            4308823 A1 *  9/1994   ............. G01B 5/012
DE    10 2007 022 326 A1   11/2008
(Continued)

OTHER PUBLICATIONS

International Search Report for PCT/EP2014/066556; dated Oct. 17, 2014; 2 pages.
(Continued)

*Primary Examiner* — Christopher W Fulton
(74) *Attorney, Agent, or Firm* — Harness, Dickey & Pierce, P.L.C.

(57) ABSTRACT

A probe head for a coordinate measuring machine has a first probe head part with an interface, for coupling the probe head to the coordinate measuring machine. A second probe head part is coupled to the first probe head part and is rotatable relative to the first probe head part about a first axis. A third probe head part is coupled to the second probe head part and is pivotable relative to the second probe head part about a second axis. The first and second axes lie askew in relation to each other. A first actuator pivots the third probe head part about the second axis via a push rod coupled to the third probe head part at a lateral distance from the second axis. The first actuator moves the push rod in a longitudinal direction to pivot the third probe head part relative to the second probe head part.

22 Claims, 4 Drawing Sheets

(51) Int. Cl.
 *G01B 5/00* (2006.01)
 *G01B 11/00* (2006.01)
(58) Field of Classification Search
 USPC .......................................... 33/503, 556, 559
 See application file for complete search history.

(56) References Cited

U.S. PATENT DOCUMENTS

| | | | | |
|---|---|---|---|---|
| 4,130,941 | A | * | 12/1978 | Amsbury ............... G01B 7/012 |
| | | | | 33/503 |
| 4,503,616 | A | * | 3/1985 | Pullen ................... G01B 7/001 |
| | | | | 33/558 |
| 4,888,877 | A | * | 12/1989 | Enderle ................. G01B 5/012 |
| | | | | 33/559 |
| 5,615,489 | A | * | 4/1997 | Breyer ................... G01B 5/012 |
| | | | | 33/503 |
| 5,918,378 | A | * | 7/1999 | McMurtry ........... G01B 21/047 |
| | | | | 33/556 |
| 7,100,297 | B2 | * | 9/2006 | McMurtry ............. G01B 7/012 |
| | | | | 33/556 |
| 7,503,125 | B2 | | 3/2009 | Jordil et al. |
| 2006/0010701 | A1 | | 1/2006 | Jordil et al. |
| 2006/0130349 | A1 | * | 6/2006 | Jordil .................... G01B 5/012 |
| | | | | 33/559 |
| 2008/0134486 | A1 | * | 6/2008 | Enderle ............... G01B 21/047 |
| | | | | 29/33 R |
| 2009/0300929 | A1 | * | 12/2009 | McDonnell, IV ..... G01B 5/201 |
| | | | | 33/559 |

FOREIGN PATENT DOCUMENTS

| | | | | |
|---|---|---|---|---|
| DE | 102007022326 A1 | * | 11/2008 | ............ G01B 5/012 |
| EP | 0 317 967 A2 | | 5/1989 | |
| EP | 0 502 592 A1 | | 9/1992 | |
| EP | 1 602 900 A2 | | 12/2005 | |
| WO | 2008/135144 A1 | | 11/2008 | |
| WO | WO-2016015775 A1 | * | 2/2016 | ........... G01B 5/0014 |

OTHER PUBLICATIONS

International Preliminary Report on Patentability (Chapter 1) for PCT/EP2014/066556; dated Feb. 9, 2017; 11 pp.

* cited by examiner

PROBE HEAD FOR A COORDINATE MEASURING MACHINE

CROSS-REFERENCES TO RELATED APPLICATIONS

This application is a continuation of international patent application PCT/EP2014/066556 filed on Jul. 31, 2014 designating the U.S. The whole content of this prior application is incorporated herein by reference.

BACKGROUND OF THE INVENTION

The present invention relates to a probe head for a coordinate measuring machine and to a coordinate measuring machine using such a probe head. More particularly, the invention relates to a probe head comprising two axes of rotation for positioning a probing element, such as a stylus, in a desired rotary position about one or two axes of rotation.

A coordinate measuring machine in terms of the present invention is a device for recording selected measurement points on a measurement object using the probe head and for determining coordinates of any selected measurement point relative to a predefined coordinate system. The coordinates represent the position of the respective measurement point in the defined coordinate system. The coordinate system is often a three-dimensional coordinate system, such that the measurement point coordinates represent the spatial position of the measurement point. Determination of a large number of measurement point coordinates for a large number of measurement points makes it possible to measure geometric properties of a workpiece, for example the diameter of a bore, the distance between two workpiece edges, or the height of a projection on the workpiece. Even a complex 3D free-form of a workpiece, such as the form of a turbine blade, can be measured by recording a large number of measurement points on the workpiece.

Typically, the probe head of the coordinate measuring machine is movable within a defined measurement volume relative to the workpiece holder. With the aid of the probe head, the selected measurement points on the workpiece are detected. The measurement point coordinates are then determined on the basis of the position of the probe head relative to the workpiece holder and on the basis of the position of the probe head relative to the detected measurement points. Therefore, the probe head generally has a sensor, with the aid of which the position of the probe head relative to one or more selected measurement points can be determined. The sensor often comprises a probe element, in particular a stylus with a spherical end, with the aid of which a selected measurement point is touched. In addition, however, there are also probe heads with contactless sensors, for example with optical sensors, which determine the position of a measurement point relative to the probe head using methods of image processing, interferometry and/or laser triangulation.

EP 0 317 967 A2 discloses a coordinate measuring machine with a double-axis rotary joint, with the aid of which the sensor can be brought to different orientations (angled settings) relative to a workpiece. This makes it possible to bring a stylus to an optimal position relative to a workpiece feature, for example in order to measure a horizontally extending bore on the workpiece. As an alternative to the tactile probe head, a contactless triangulation probe head could be secured on the rotary joint and could likewise be brought to a favorable orientation relative to a workpiece.

The coordinate measuring machine with the rotary joint according to EP 0 317 967 A2 has proven useful in many practical applications. Nonetheless, there are measurement tasks for which the known coordinate measuring machine is still not optimal, for example because an optimal orientation of the stylus with the aid of the rotary joints during a continuous probing process is not easily possible.

U.S. Pat. No. 7,503,125 B2 discloses a coordinate measuring machine, with a probe head that is coupled to the coordinate measuring machine via a six-axis rotary joint. Such a rotary joint permits almost any desired spatial orientations of the probe head. However, such a rotary joint is very complex and heavy and takes up quite a lot of space within the available measurement volume of a coordinate measuring machine.

US 2006/0010701 A1 discloses a probe head for a coordinate measuring machine, wherein the probe head itself has two integrated rotary drives so as to be able to bring the stylus into different orientations. In some exemplary embodiments, the stylus is laterally offset with respect to one or both rotation axes in order to permit different height positions in the vertical direction when a stylus is pivoted into the horizontal. However, the addition of a further rotation axis or the replacement of the probe element by another sensor are not readily possible in this probe head. Consequently, this probe head too is not optimal in terms of its possibilities of use.

A further probe head with an integrated rotary unit is known from EP 1 602 900 A2. The known probe head has two electrical drives, which are not only needed to change the current orientation of the stylus, but also to hold the stylus in its current orientation. Accordingly, the electrical drives have to be supplied with current during a measurement with the probe head, and this permanently generates heat in the probe head. The replacement of the sensor or the addition of a further rotation or pivot axis also appear to be problematic in this case.

DE 10 2007 022 326 A1 discloses a coordinate measuring machine with a passive rotary joint, i.e. with a rotary pivot joint that does not require integrated electrical drives. The rotary joint has two toothed wheels which are accessible from the outside and which can each be turned by means of the probe head being driven linearly with respect to a rack with the aid of the drives of the coordinate measuring machine frame. This passive rotary mechanism thus minimizes heat input in the area of the probe element, as is desirable with regard to measurement precision. However, adjustment of the probe element is time-consuming here and can only be conceivably done with difficulty during a probe procedure.

Generally, there is a desire that a sensor for detecting measurement points on a measurement object can be spatially oriented as flexibly as possible in order to be able to detect the greatest possible number of different measurement points on a workpiece without having to change the position of the workpiece. It is also desirable to be able to use different probe heads with different sensor principles and/or probe elements on one coordinate measuring machine, since the different sensor principles and probe elements each have different advantages and disadvantages, and therefore different probe elements and sensor principles may be advantageous for a specific measurement purpose. Moreover, it is desirable if the probe head of a coordinate measuring machine is as light and as compact as possible, so that it permits rapid movements of the coordinate measuring machine in the measurement process and takes up very little of the available measurement volume.

SUMMARY OF THE INVENTION

Against this background, it is an object of the present invention to provide a probe head that offers great flexibility so as to be able to perform different measurement tasks rapidly and with a high degree of precision.

It is another object of the invention to provide a lightweight probe head having at least two axes of rotation.

It is yet another object of the invention to provide a coordinate measuring machine which is able to perform various measurement tasks with great flexibility, efficiency and precision using such a probe head.

According to a first aspect of the invention, there is provided a probe head for a coordinate measuring machine for determining measurement point coordinates on a workpiece, the probe head comprising a first probe head part having a first change-over interface which is designed to couple the probe head to the coordinate measuring machine, comprising a second probe head part coupled to the first probe head part and rotatable relative to the first probe head part about a first axis, comprising a third probe head part coupled to the second probe head part and pivotable relative to the second probe head part about a second axis, wherein the first axis and the second axis lie skew in relation to each other, comprising a first actuator designed to pivot the third probe head part about the second axis, and comprising a push rod coupled to the third probe head part at a lateral distance from the second axis, wherein the first actuator moves the push rod in a longitudinal direction in order to pivot the third probe head part in relation to the second probe head part.

According to another aspect, there is provided a coordinate measuring machine for determining measurement point coordinates on a workpiece, comprising a workpiece holder for the workpiece, comprising a frame on which a probe head is secured, and comprising an evaluation and control unit designed to bring the probe head to a defined position relative to the workpiece holder and to determine measurement point coordinates on the workpiece as a function of the defined position, wherein the probe head comprises a first probe head part having a first change-over interface which is designed to couple the probe head to the coordinate measuring machine, a second probe head part coupled to the first probe head part and rotatable relative to the first probe head part about a first axis, a third probe head part coupled to the second probe head part and pivotable relative to the second probe head part about a second axis, wherein the first axis and the second axis lie skew in relation to each other, a first actuator designed to pivot the third probe head part about the second axis, and a push rod coupled to the third probe head part at a lateral distance from the second axis, wherein the first actuator moves the push rod in a longitudinal direction in order to pivot the third probe head part in relation to the second probe head part to a first aspect of the invention, there is provided a probe.

The novel probe head has two integrated axes of rotation which lie skew in relation to each other. Skew means here that the two axes do not intersect in space and also do not extend parallel to each other. The two axes are preferably arranged orthogonally to each other with a defined spacing, such that the third probe head part can be rotated or pivoted about two spatial axes arranged orthogonally to each other. The rotation movement about the first axis is advantageously possible in a continuous and unlimited manner, while the pivoting movement about the second axis is limited to a defined pivot angle of +/−45° in preferred embodiments. In principle, however, the first axis and the second axis could be arranged to be non-orthogonal to each other and thus enclose an angle other than 90°.

Here, the first axis and the second axis are deliberately arranged skew in relation to each other, i.e. the skew arrangement of the two axes is not an undesired consequence of manufacturing tolerances, such as with prior art probe heads or rotary joints, but an intentional design feature. By way of example, the skew arrangement of the rotation and pivot axis in the coordinate measuring machine from EP 0 317 967 A2 is an undesired feature that is taken into account in the calibration of the rotary joint. The novel probe head, in contrast, makes deliberate use of the structurally intentional lateral spacing between the first axis and second axis in order to pivot the third probe head part relative to the second probe head part with the aid of the push rod. The lateral spacing between the first axis and second axis therefore serves to effect the pivoting movement of the third probe head part relative to the second probe head part with the aid of a simple movement in the longitudinal direction.

The intentionally skew arrangement of the first axis and second axis, in combination with the push rod, permits a very simple and compact integration of the two axes of movement in the novel probe head. It is thereby advantageously possible for the probe head with integrated axes of movement to be arranged on a rotary pivot joint with further axes of movement. In total, therefore, such a combination then offers four substantially independent rotation and pivot axes and thus permits great flexibility as regards the spatial orientation of the probe head. The combination of the novel probe head with a rotary pivot joint is particularly advantageous for rapid tactile probing of complex workpieces, because the probe element can be moved about the four rotation and pivot axes and can thus very easily follow a complex workpiece geometry. For example, with the aid of the novel probe head on a rotary pivot joint, it is possible to measure an oblique bevel toothing on a workpiece in a very advantageous manner without a rotary table or another rotatable workpiece holder. In addition, the novel probe head very advantageously simplifies difficult measurements in very confined workpiece geometries.

Furthermore, by virtue of its light and compact design, the novel probe head can very easily be used on a rotary pivot joint on which other probe heads, in particular contactless probe heads, can also be used alternatively. The novel probe head thus offers a particularly high degree of flexibility. Even very complex measurement tasks can be performed rapidly and with great precision. The abovementioned object is completely achieved.

In a preferred refinement of the invention, the longitudinal direction extends parallel to the first axis and in particular along the first axis.

In preferred exemplary embodiments of this refinement, the push rod is arranged parallel to the first axis and in particular along the first axis. In this case, the second probe head part rotates about the push rod. This permits a particularly compact configuration which, in addition, can be very easily tared. However, even if the push rod is not arranged exactly on the first axis, this refinement permits a very compact and light configuration. This refinement is particularly advantageous if the first axis and second axis are arranged orthogonally to each other, since in this case the push rod very efficiently generates a torque about the second axis. The first actuator can then be made relatively small and light.

In a further refinement, the probe head comprises a hollow shaft via which the second probe head part is arranged rotatably on the first probe head part, wherein the push rod runs in the hollow shaft.

This refinement also contributes advantageously to a very compact and light configuration. It additionally permits a favorable weight distribution. It is particularly advantageous if the push rod and the hollow shaft lie concentrically with respect to a straight line on which a stylus, arranged in the probe head, also lies with its longitudinal axis. In this advantageous variant, push rod, hollow shaft and stylus define a common longitudinal axis about which the second probe head part rotates relative to the first probe head part and along which the push rod is moved in order to pivot the third probe head part relative to the second probe head part.

In a further refinement, the push rod comprises a spindle, which is driven by the first actuator. The first actuator is preferably an electric motor which is coupled to the push rod with frictional engagement and/or form-fit engagement. In some refinements, the first actuator can be a linear drive. By contrast, in a presently preferred exemplary embodiment, the first actuator is an electric motor that generates a rotation movement.

This refinement permits a very high degree of efficiency, with the result that a comparatively small and light actuator is sufficient for pivoting the third probe head part. Moreover, this refinement can be realized very cost-effectively. In addition, the spindle permits simple self-retention, such that the first actuator has to be set in operation only in order to change the pivot position of the third probe head part relative to the second probe head part. As soon as the third probe head part has reached a desired pivot position, the first actuator can be switched off, which is advantageous for minimizing any operationally induced heating of the probe head.

In a further refinement, the push rod is coupled to the third probe head part via a spring element, in particular a helical spring. The push rod is preferably secured rotatably on the spring element via a rotary bearing, in particular a ball bearing, such that the push rod is able to rotate relative to the spring element. Alternatively or in addition to this, the spring element, in further refinements, can be secured rotatably on the third probe head part via a (further) rotary bearing. Instead of ball bearings, slide bearings can be used in some exemplary embodiments in order to uncouple the spring element and/or the third probe head part from the rotation movement of the spindle.

With the aid of the spring element, it is possible in a very advantageous manner to generate a defined measuring force that is desirable for probing a measurement point. In particular, with this refinement, a measuring force component can be generated in the longitudinal direction. The spring element is preferably a mechanical spring element. Alternatively or in addition, however, the spring element could be a magnetic spring element, for example. The generation of the measuring force is passive here, which is advantageous for minimizing heating of the probe head during operation. Alternatively, in other refinements, it is possible to generate the measuring force with the aid of an actively controlled element, for example a moving coil or a piezo actuator. Securing the spring element on the push rod via a ball bearing permits good uncoupling, with the result that, during the probing of a measurement point, a stylus only has to move against the spring force. The refinement is also advantageous in that it permits very simple and efficient taring of the probe head in the longitudinal direction with the aid of the push rod.

In a further refinement, the probe head has a first and a second sensor element, wherein the first sensor element delivers a first sensor value, which is representative of a current position of the push rod, and wherein the second sensor element delivers a second sensor value, which is representative of a current position of the third probe head part relative to the second probe head part.

This refinement permits very simple and cost-effective determination of the passively generated measuring force on the basis of a difference of said sensor values. The first sensor value represents the current position of the push rod and, therefore, a desired value for the position of the third probe head part relative to the second probe head part. The second sensor value supplies the current position of the third probe head part. The difference between the desired position and the current position is a measure of the deflection of the third probe head part relative to the second probe head part against the spring force of the spring element. With the aid of the spring constant, which in the preferred refinements is stored as a parameter value in a memory of the probe head and/or the evaluation and control unit, the measuring force actually exerted on a measurement point can be defined in a very simple way, which is advantageous for a high degree of measuring precision. The evaluation and control unit is preferably configured to determine the measurement point coordinates of a probed measurement point as a function of the measuring force that was determined beforehand on the basis of said sensor values.

In a further refinement, the probe head has a drive wheel and a second actuator, which is designed to set the drive wheel in a rotary movement, wherein the drive wheel is coupled rigidly to the first probe head part and resiliently to the second probe head part, or vice versa.

The resilient coupling ensures that there is a defined play in the drivetrain from the second actuator to the second probe head part. By virtue of this play, the second actuator is able on the one hand to rotate the second probe head part relative to the first probe head part. On the other hand, the second probe head part is able to rotate relative to the second probe head part about a limited pivoting angle, even if the second actuator is not activated. This refinement therefore permits a desirable deflection of the second probe head part relative to the first probe head part during the probing of a measurement point. The resilient coupling can be used very advantageously to generate a passive measuring force transverse to the first axis. This refinement also contributes to minimizing operationally induced heating of the probe head. The drive wheel is preferably mounted on the first probe head part and resiliently coupled to the second probe head part via a spring element, since this facilitates a particularly compact and stable set-up.

In another preferred refinement, the probe head has a magnetic element via which the drive wheel is resiliently coupled to the second probe head part (or alternatively to the first probe head part).

In this refinement, the defined and limited play between the second actuator and the second probe head part is achieved via a magnetic coupling. Accordingly, the magnetic force generated with the aid of the magnetic element serves to generate a measuring force. During the probing of a measurement point, the second probe head part is able to rotate counter to the magnetic force of the magnetic element, although the second actuator is coupled to the second probe head part via the drive wheel. As an alternative to this, the resilient coupling in other refinements of the invention could be obtained with a mechanical spring element, for example a spiral spring, a helical spring, a torsion bar spring, or another spring element working against the rotation movement. By contrast, the magnetic coupling has the advantage that it is free from friction. It additionally permits a particularly compact and low-wear configuration.

In another refinement, the probe head has a third sensor element, which delivers a third sensor value, and a fourth sensor element, which delivers a fourth sensor value, wherein the third sensor value is representative of a rotation position of the drive wheel, and wherein the fourth sensor value is representative of a rotation position of the second probe head part relative to the first probe head part.

This refinement permits very simple and cost-effective determination of the measuring force transverse to the first axis. Similarly to what has already been described above with respect to the first sensor element and second sensor element, the measuring force can here be very easily determined on the basis of the difference between the current rotation position of the drive wheel and the current rotation position of the second probe head part relative to the first probe head part. The third sensor value represents a desired position of the second probe head part relative to the first probe head part. The fourth sensor value represents the current rotation position. The difference between these two rotation positions correlates with the measuring force that the probe head exerts on a measurement point transversely with respect to the first axis. The evaluation and control unit is preferably configured to determine the measurement point coordinates of a probed measurement point as a function of the measuring force that was determined beforehand on the basis of the third and fourth sensor values.

In another refinement, the third probe head part has a second change-over interface, which is designed for the releasable coupling of a probe element, in particular of a stylus. The second change-over interface preferably comprises one or more positioning elements, with the aid of which a defined position of the probe element relative to the third probe head part is guaranteed to be reproducible. For example, the change-over interface can comprise a trio of cylinder rollers arranged in pairs alongside each other, while the probe element has a trio of balls, wherein one ball in each case engages between a pair of cylinder rollers when the probe element is secured on the third probe head part. As an alternative to this, the probe head part could have a corresponding trio of balls, wherein one ball in each case engages between two cylinder rollers on the probe element.

The refinement has, on the one hand, the advantage that the probe element can be secured exchangeably on the novel probe head. In particular, styluses of different lengths and/or different combinations of styluses can thus be secured alternately on the probe head. Thus, the refinement increases still further the flexibility as regards performance of various measurement tasks. Instead of a probe element, however, another sensor could in principle be coupled to the second change-over interface, for example a contactless optical sensor. In addition, with the aid of the change-over interface, a very effective collision protection can be obtained, since the probe element can "tear off" in a blockade on the change-over interface without damaging the mechanics of the probe head. In preferred exemplary embodiments, the probe element is therefore held on the third probe head part purely magnetically, so as to permit nondestructive "tearing off" in the event of a collision.

It is particularly preferable if, in the area of the second change-over interface, the probe head has a further sensor element, with the aid of which the detachment of the probe element from the third probe head part can be detected. In these cases, it is advantageous if the evaluation and control unit of the coordinate measuring machine stops the movement of the probe head relative to the workpiece, or relative to the workpiece holder, as soon as the further sensor element delivers a corresponding signal. In some exemplary embodiments, the further sensor element comprises an electrical contact path which, for example, can be routed over one or more positioning elements, wherein the contact path is interrupted when the probe element detaches from the positioning element on the third probe head part.

In a further refinement, the probe head has a probe element with a base, a probe tip remote from the base, and a center of gravity lying between the base and the probe tip, wherein the center of gravity lies on a path that represents a minimum distance between the first and second axes.

In this refinement, the base and the probe tip of the probe element lie on different sides of a plane which lies perpendicularly with respect to the first axis and in which the second axis extends. The refinement has the advantage that the probe head is tared with the probe element transversely with respect to the first axis. A pivoting of the probe head from a position in which the first axis lies vertically to a second position in which the first axis lies horizontally thus has no appreciable effect on the position of the probe element relative to the third probe head part. In other words, even with the probe head pivoted into the horizontal position, the probe element is able to move without the need for weight compensation. It is only in the longitudinal direction in which the push rod moves that the weight of the probe element may then have to be compensated, which can be done very easily and efficiently with the aid of the push rod in the advantageous exemplary embodiments.

In a further refinement, the probe element has two styluses extending orthogonally to each other, of which one can be positioned parallel to the first axis with the aid of the third probe head part.

In this refinement, the probe head has a probe element with two styluses arranged relative to each other in an L shape. In the preferred exemplary embodiments, one of these styluses, in the rest state, is parallel to the first axis and in particular arranged on the first axis. The second stylus is in this case transverse to the first axis. Upon rotation of the second probe head part relative to the first probe head part, the second stylus is able to run along a circular scanning path. In this way, internal diameters of bores or the like can be measured easily and rapidly. In addition, a pivoting movement of the two styluses can be generated with the aid of the second axis, which is advantageous, for example, for measuring a helical groove profile inside a bore. Moreover, the stylus arranged parallel to the first axis is likewise available, such that the novel probe head is even more versatile and can be adapted more flexibly to different measurement tasks.

It will be appreciated that the aforementioned features and those still to be explained below can be used not only in the respectively cited combination but also in other combinations or singly, without departing from the scope of the present invention.

BRIEF DESCRIPTION OF THE DRAWINGS

Exemplary embodiments of the invention are shown in the drawing and are explained in greater detail in the following description. In the figures.

DESCRIPTION OF PREFERRED EMBODIMENTS

Figure 1:
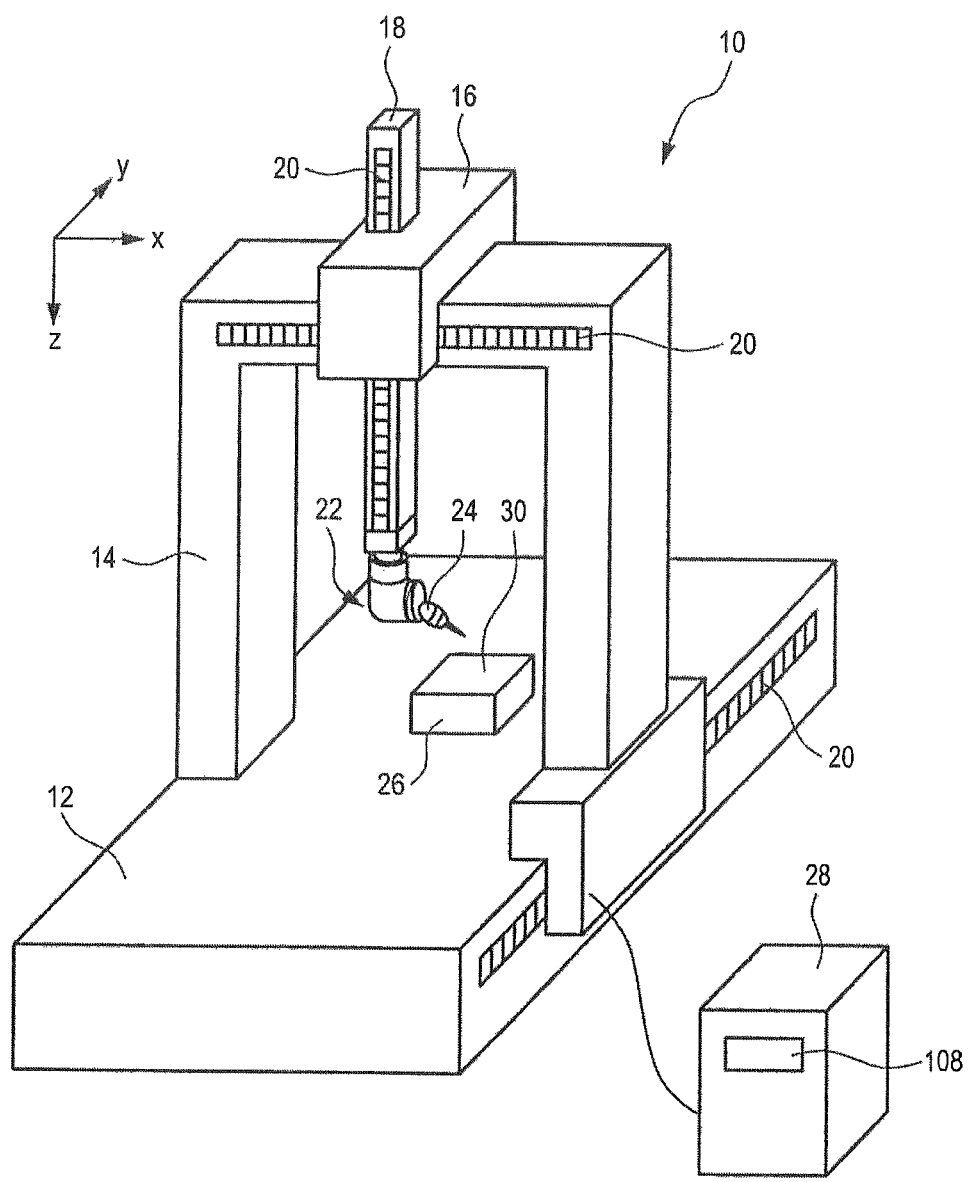
FIG. 1 shows a simplified view of a coordinate measuring machine according to an exemplary embodiment of the present invention.

In FIG. 1, a coordinate measuring machine according to an exemplary embodiment of the invention is designated in its entirety by reference number 10. The coordinate measuring machine 10 here has a base 12 on which a gantry 14 is arranged. With the aid of an electrical drive (not shown in detail here), the gantry 14 can be driven on the base 12 in a longitudinal direction, which is usually designated they axis. Arranged on the upper cross-piece of the gantry 14 is a carriage 16 which, with the aid of a further electrical drive (likewise not shown here), can be driven along a second direction, which is usually designated the x axis. The carriage 16 carries a sleeve 18 which, with the aid of a further drive, can be driven in a third longitudinal direction, which is usually designated the z axis. The three axes of movement of the coordinate measuring machine 10 are typically orthogonal to each other.

Here, reference number 20 indicates graduations arranged along the axes of movement of the coordinate measuring machine 10. With the aid of the graduations, it is possible to determine respectively the current position of the gantry 14 relative to the base 12, the current position of the carriage 16 relative to the gantry 14, and the current position of the sleeve 18 relative to the carriage 16.

Figure 2:
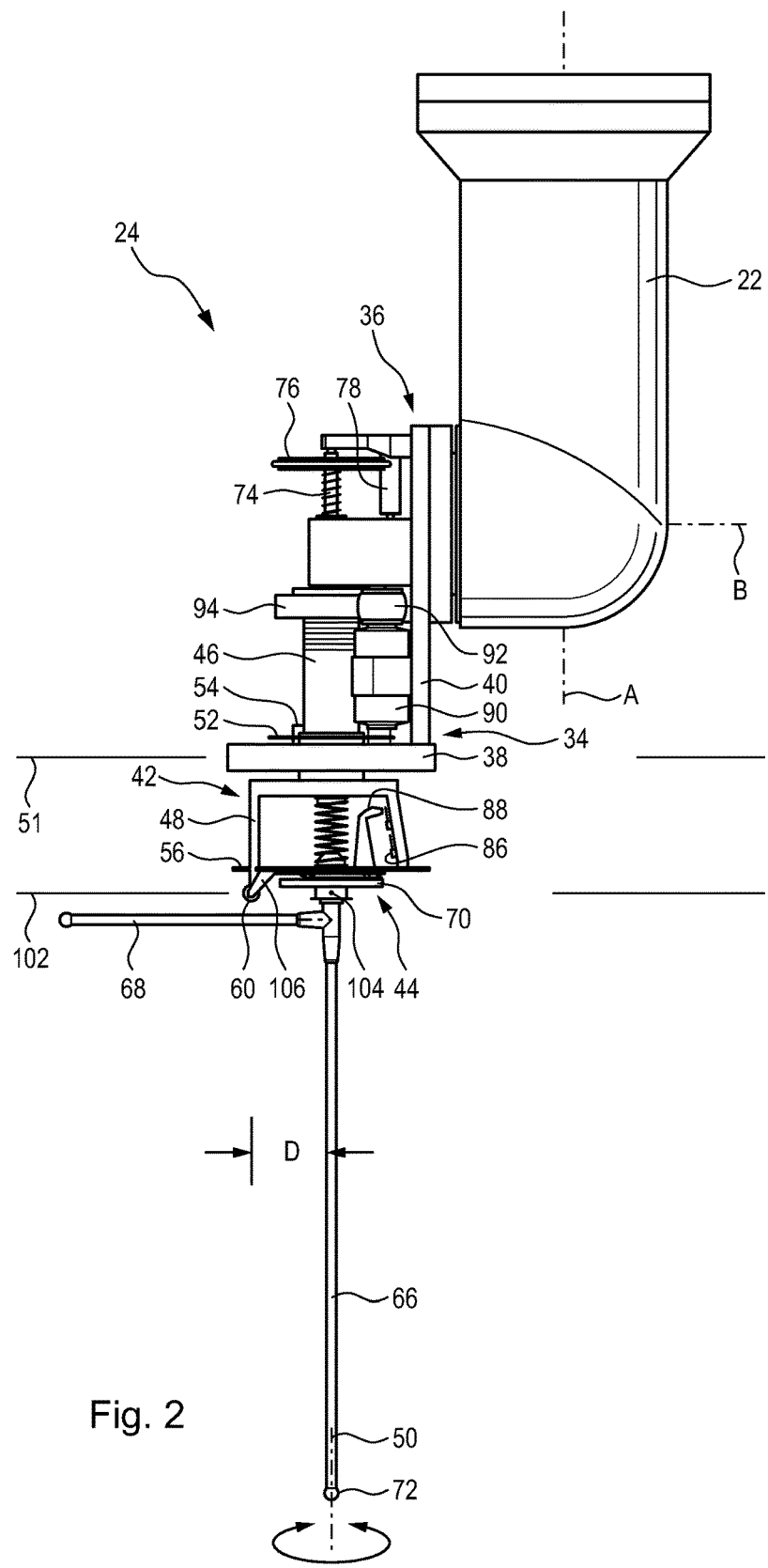
FIG. 2 shows an exemplary embodiment of the novel probe head on a rotary pivot joint.

Here, a rotary pivot joint 22 is arranged at the lower free end of the sleeve 18 and carries a probe head 24 according to a preferred exemplary embodiment. With the aid of the rotary pivot joint 22, the probe head 24 can be rotated about two mutually orthogonal rotation axes and pivoted. In the exemplary embodiment shown, the first rotation axis runs parallel to the z axis. It is typically designated the A axis (see FIG. 2). The second rotation axis is orthogonal to the A axis and is typically designated the B axis (FIG. 2). In some exemplary embodiments, the rotary pivot joint 22 can be a locking rotary pivot joint. In this case, the number of possible rotation positions or pivot positions is limited. The rotary pivot joint 22 locks in the respectively chosen rotation position and pivot position. Electrical drives (not shown here) are only needed for setting a new rotation position or pivot position.

In other exemplary embodiments, the rotary pivot joint 22 can be a continuous rotary pivot joint, such that the probe head 24 can be oriented in an unlimited number of rotation positions and pivot positions. In principle, the novel probe head 24 can additionally be secured rigidly on the sleeve 18 of a coordinate measuring machine 10, since the probe head 24 itself makes further rotation axes available. From the current point of view, however, the combination of the novel probe head 24 with a rotary pivot joint 22 is particularly advantageous.

Reference number 26 designates a measurement object, which is here placed on the base 12. Therefore, in this exemplary embodiment, the base 12 not only supports the gantry 14, it also functions as a workpiece holder. In other exemplary embodiments, a separate workpiece holder can be provided for positioning a measurement object 26.

Generally, the present invention is not limited to coordinate measuring machines with a gantry structure. It can likewise be realized in coordinate measuring machines in which the probe head 24 can be positioned in another way relative to a measurement object 26, in particular in coordinate measuring machines with a movable workpiece holder in the form of an xy stage, or in coordinate measuring machines with a horizontal arm structure.

Reference sign 28 designates an evaluation and control unit, which is here connected by a cable connection to the electrical drives and to the read heads for the graduations 20. The evaluation and control unit 28 is designed to control the movements of the coordinate measuring machine 10 along the axes x, y, z, the movements of the rotary pivot joint 22 about the axes A and B and also the movements of the probe head 24, in order to probe selected measurement points 30 on the measurement object 26. Furthermore, the evaluation and control unit 28 is designed to use the current position of the probe head 24 within the measurement volume of the coordinate measuring machine 10, and to use the sensor values of the probe head 24 as explained in more detail below, to determine spatial coordinates that represent the position of the respectively probed measurement point 30 within the measurement volume. By probing a large number of measurement points 30, geometric properties of the measurement object 26 can then be determined. This is typically done using evaluation software that is run either on the evaluation and control unit 28 or on a separate evaluation PC.

Figure 3:
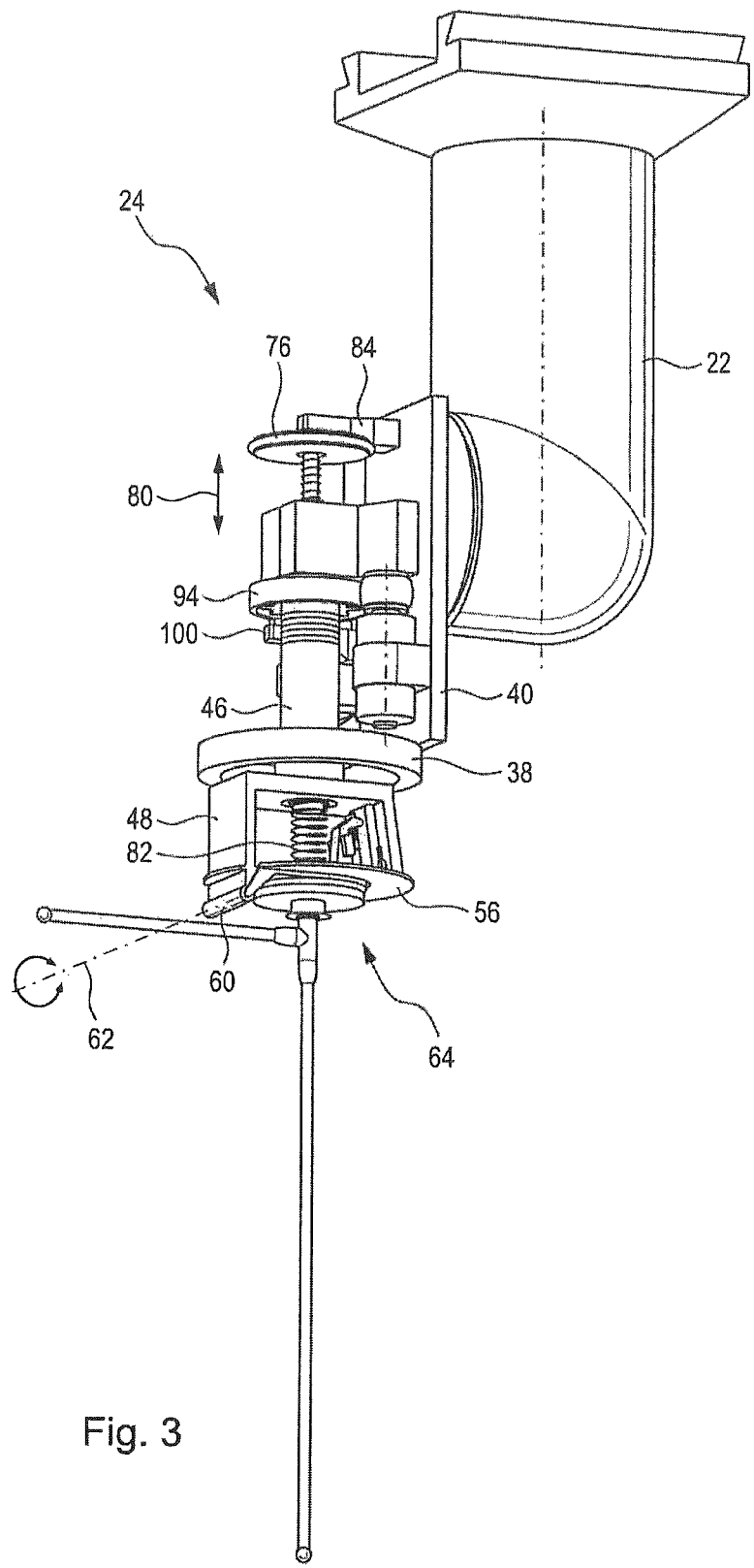
FIG. 3 shows the probe head from FIG. 2 in a further view.
Figure 4:
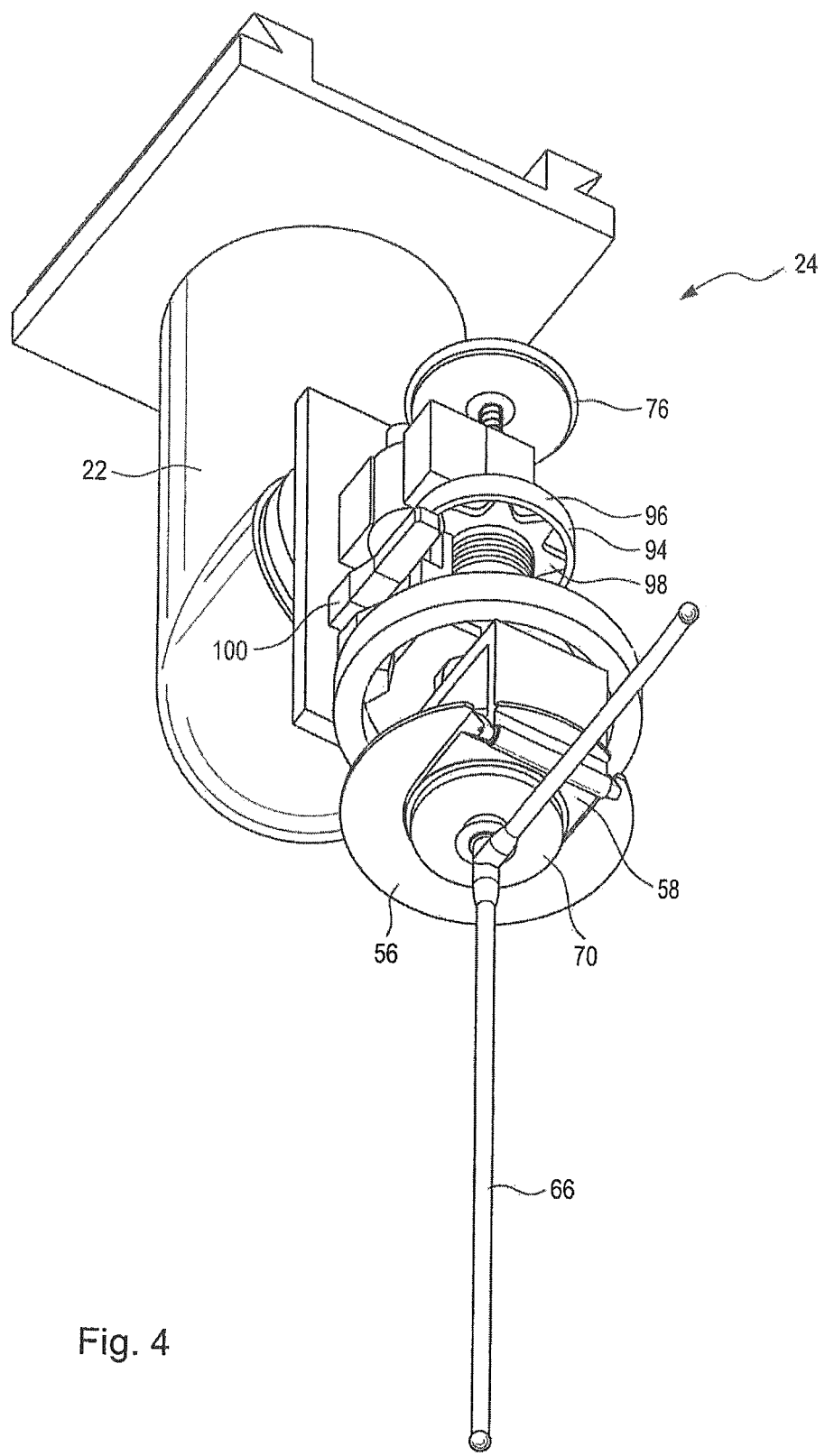
FIG. 4 shows the probe head from FIG. 2 in a view obliquely from below.

FIGS. 2 to 4 show a preferred exemplary embodiment of the novel probe head 24 on the rotary pivot joint 22. Identical reference signs designate the same elements as before.

The probe head 24 has a first probe head part 34 with a first change-over interface 36, which is designed for the releasable and exchangeable coupling of the probe head 24 on the rotary pivot joint 22. In the preferred exemplary embodiments, the first change-over interface 36 is configured with the aid of a magnetically held plate (not shown in detail here), as is known from other probe heads already on the market. In some embodiments, the rotary pivot joint 22 is a locking rotary pivot joint of the kind supplied and sold by the applicant under the designation RDS. Accordingly, the first change-over interface 36 in the preferred exemplary embodiments is compatible with the probe head interface of the RDS rotary pivot joint from Zeiss. In principle, however, the probe head 24 could also have a first change-over interface 36 compatible with corresponding probe head holders from other manufacturers of coordinate measuring machines. In particular, the first change-over interface can be designed for direct coupling of the probe head 24 to the free end of the sleeve 18 of a coordinate measuring machine.

In this exemplary embodiment, the first probe head part 34 has a ring 38 and a plate 40, which is here arranged perpendicularly with respect to the ring 38 and, in the side view according to FIG. 2, forms an L shape together with the ring 38. The first change-over interface 36 is arranged on the free end of the plate 40 directed away from the ring 38.

The first probe head part 34 forms the base of the probe head 24, to which a second probe head part 42 and a third probe head part 44 are each movably coupled. In this exemplary embodiment, the second probe head part 42 contains a hollow shaft 46 and a bracket 48, which is arranged on a first (lower) end of the hollow shaft 46 and is rigidly connected to the hollow shaft 46. In the present exemplary embodiment, the hollow shaft 46 protrudes with a first end through the ring 38 of the first probe head part 34, and the bracket 48 is arranged underneath the ring 38 in the view in FIG. 2. In other words, the bracket 48 sits below a plane 51 spanned by the ring 38, while the hollow shaft 46 passes perpendicularly through this plane 51. In the preferred exemplary embodiments, the longitudinal axis 50 of the hollow shaft 46 runs orthogonally with respect to the plane 51 spanned by the ring 38.

An encoder disk 52, here arranged parallel to the ring 38, is arranged on the hollow shaft 46. In the area of the encoder disk 52, a sensor element 54 is secured on the plate 40. A current rotation position of the hollow shaft 46 relative to the ring 38 can be determined with the aid of the sensor element 54. Accordingly, the sensor element 54 delivers a sensor value representative of the current rotation position of the second probe head part 42 relative to the first probe head part 34.

The second probe head part 42 moreover comprises an annular disk 56, which here has a U-shaped portion. A plate 58, which is mounted pivotably on a free end of the bracket 48 via a hinge 60, is arranged in the U-shaped portion. The plate 58 belongs to the third probe head part 44, which is held pivotably on the second probe head part 42 via the hinge 60. The pivot axis about which the plate 58 can be pivoted relative to the bracket 48 is indicated in FIG. 3 by reference number 62.

On its underside (here the side directed away from the hollow shaft 46), the plate 58 has a second change-over interface 64, which is designed to exchangeably receive a probe element. In the present exemplary embodiment, the probe element is a stylus combination with a first stylus 66, a second stylus 68 and a base 70. The first stylus 66 is here arranged on the longitudinal axis 50 of the hollow shaft 46, i.e. it extends in the center of the imaginary continuation of the hollow shaft 46. The second stylus 68 is here arranged orthogonally with respect to the first stylus 66. The two styluses 66, 68 here define an L shape, at the corner point of which the base 70 sits. The mating piece for the second change-over interface 64 is formed on the base 70, such that the stylus combination 66, 68 is held exchangeably on the change-over interface 64.

In a departure from the exemplary embodiment shown here, other stylus combinations could be arranged on the second change-over interface 64, or even a single stylus, which then preferably extends along the longitudinal axis 50. Instead of the styluses 66, 68, which here each have a spherical probe tip 72, other probe elements may in principle also be secured on the change-over interface 64.

In order to effect a pivoting movement of the plate 58 about the pivot axis 62, the plate 58 is coupled to a push rod 74. In this preferred exemplary embodiment, the push rod 74 extends through the clear width of the hollow shaft 46 and in particular lies concentrically with respect to the hollow shaft. In the exemplary embodiment shown, the push rod 74 is designed as a spindle which, at its upper free end, carries a drive wheel 76. The drive wheel 76 is here coupled to an electrical rotary drive 78. Here, by frictional and/or form-fit engagement, the rotary drive 78 is able to set the drive wheel 76 in a rotation movement about the longitudinal axis 50. As a result of this rotation movement, the push rod 74, designed as a spindle, moves linearly along the longitudinal axis 50, as is indicated in FIG. 3 by means of the double arrow 80. Since the hinge 60, which defines the pivot axis 62, is arranged skew and, in the preferred exemplary embodiment, orthogonal to the longitudinal axis 50, and at a lateral distance D from the latter, the linear movement 80 of the push rod 74 leads to a torque, which pivots the plate 58 relative to the bracket 48 about the pivot axis 62. Thus, the rotary drive 78 here is a first actuator, with the aid of which the third probe head part 44 can be pivoted relative to the second probe head part 42. On account of the preferred self-locking of the spindle 74, the actuator 78 is only needed to change the pivot position of the third probe head part 44 relative to the second probe head part 42. The rotary drive 78 therefore only has to be actuated briefly, and relatively infrequently, during the operation of the probe head 24.

As an alternative to the exemplary embodiment shown here with a spindle, the push rod 74 in other exemplary embodiments can be moved purely in translation, in particular with the aid of a linear drive as first actuator.

As can be seen in FIGS. 2 and 3, the plate 58 is here coupled to the free end of the push rod 74 via a spring element in the form of a helical spring 82. Independently of the pivot position that can be set with the aid of the rotary drive 78 and the push rod 74, the spring element 82 permits a relative movement of the third probe head part 44 relative to the second probe head part 42. This relative movement takes place counter to the spring force of the spring element 82. Accordingly, with the aid of the spring element 82, a measuring force can be generated when probing a measurement point on a measurement object 26. In the preferred exemplary embodiments, the spring element 82 is coupled to the spindle-shaped push rod 74 via a rotary bearing. In some exemplary embodiments, this rotary bearing is designed as a roller bearing, in particular as a ball bearing. In other exemplary embodiments, the rotary bearing is a simple slide bearing. In further exemplary embodiments, the spring element 82 can be secured on the plate 58 or the third probe head part 44 via a corresponding rotary bearing.

In this exemplary embodiment, the probe head 24 moreover has a (first) sensor element 84, with the aid of which a current rotation position of the drive wheel 76 can be detected. Accordingly, the sensor element 84 delivers a first sensor value, which is also representative of a current position of the push rod. The current position of the push rod is in turn representative of a desired position of the third probe head part 44 relative to the second probe head part 42 about the pivot axis 62. The actual position of the third probe head part 44 can deviate from the desired position, set with the aid of the push rod 74, if the probe tip 72 of one of the styluses 66, 68 presses against a measurement point on the measurement object 26, because then the third probe head part 44 deflects counter to the spring force of the spring element 82. The probe head 24 has a second sensor element 86, which delivers a second sensor value, the latter being representative of the current pivot position of the third probe head part 44 relative to the second probe head part 42. From the difference between the first sensor value and second sensor value, it is possible to determine the current measuring force generated with the aid of the spring element 82 when probing a measurement point. In the preferred exemplary embodiments, a suitably configured evaluation module is stored in the evaluation and control unit 28.

Reference number 88 designates a hook, which is arranged on the top face of the plate 58 directed away from the stylus 66. The hook 88 pivots together with the plate 58 about the pivot axis 62 and serves as a catching hook which defines the maximum angle of pivoting of the third probe head part 44 about the pivot axis 62. At the maximum angle of pivoting, the free end of the hook 88 catches on the annular disk 56 of the second probe head part 42 and blocks a further movement of the third probe head part.

In addition, in this exemplary embodiment, the hook 88 serves as a retainer for magnets, the current position of which relative to the second sensor element 86 can be detected. In some exemplary embodiments, the second sensor element 86 is a Hall element or a magneto-resistive sensor element, with the aid of which a current magnetic field direction at the location of the sensor element can be detected. As an alternative to this, the second sensor element 86 could be an optical sensor element or any other kind of sensor element that generates a second sensor value representative of the current position of the third probe head part 44 relative to the second probe head part 42 about the pivot axis 62.

In order to effect a rotation of the second probe head part 42 relative to the first probe head part 34, the probe head 24 here has a further rotary drive 90, which in this case is able to drive a drive wheel 94 via a friction wheel 92. As an alternative to this, the rotary drive 90 could be coupled to the drive wheel 94 by form-fit engagement or even by material bonding.

In this exemplary embodiment, the drive wheel 94 has several magnets 96 (see FIG. 4) distributed on the outer circumference of the drive wheel 94. At its upper end, the hollow shaft 46 carries a soft iron wheel 98, which in particular a star shape here. The soft iron wheel 98 is coupled resiliently to the drive wheel 94 via the magnets 96, since the star-shaped soft iron wheel 98 aligns itself within the magnetic field generated with the magnets 96. By way of the magnetic coupling, the drive wheel 94 can, on the one hand, drive the hollow shaft 46 and thus turn the second probe head part 42 relative to the first probe head part 34. On the other hand, with the drive 90 stationary, the hollow shaft 46 is able to turn counter to the drive wheel 94, the magnetic force of the magnets 96 counteracting this "free" rotation. Accordingly, with the aid of the magnetic coupling, a measuring force is passively generated during the probing of a measurement point, the magnitude of said force deriving from the torque that is generated with the aid of the magnets 96 and the soft iron wheel 98.

Reference number 100 designates a further sensor element, which is here secured on the first probe head part 34. The sensor element 100 comprises, for example, a Hall element and/or a magneto-resistive element in order to generate a further sensor value, which is representative of a current rotation position of the drive wheel 94. This further sensor value is therefore also representative of a desired position of the second probe head part 42 about the longitudinal axis 50. With the aid of the encoder disk 52, the sensor element 54 delivers a fourth sensor value, which is representative of the current rotation position of the second probe head part 42 relative to the first probe head part 34. From the difference of the sensor values that are delivered by the sensor elements 54 and 100, it is thus possible to determine the measuring force with which a stylus 66, 68 presses against the measurement point when probing a measurement object (tangential or transverse component of the measuring force).

In other exemplary embodiments, instead of the magnetic coupling and the measuring force component thus generated, the probe head 24 can comprise a further mechanical spring element, for example in the form of a helical spring. Moreover, it is conceivable here to generate the measuring force with the aid of a moving coil, a piezo element and/or another electrically operated actuator.

As can be seen from the view in FIG. 2, the base 70 of the probe element here lies above the hinge 60 and the pivot axis 62 thereby defined, while the probe tips 72 of the styluses 66, 68 are arranged below the hinge 60. In other words, the base 70 and the probe tips 72 lie on different sides of a plane 102, which lies orthogonally with respect to the longitudinal axis 50 and comprises the pivot axis 62. In the preferred exemplary embodiments, the probe element is designed such that its center of gravity 104 comes to lie in the plane 102. This can be achieved by the fact that the base 70 of the probe head has a substantial weight compared to the styluses 66, 68, which can be achieved in particular by integration of a holding magnet in the base 70 of the probe head. The holding magnet (not shown here) advantageously serves to secure the base 70 on the third probe head part 44.

Moreover, the hinge 60 here is arranged below the plate 58 on which the base 70 of the probe element is secured. The plate 58 is secured on the hinge 60 via a rocker arm 106, wherein the rocker arm 106 brings the plate 58 closer to the first probe head part 34 than the hinge 60. This advantageous configuration has the effect that the probe head 24 has to tare the probe element 66, 68 only along the longitudinal axis 50, which is very easy to do with the aid of the push rod 74. In other words, the weight of the probe element acting on the spring element 82 can be compensated by a simple linear adjustment of the push rod 74. On account of the favorable positioning of the center of gravity 104, taring in a plane perpendicular to the longitudinal axis 50 is unnecessary here, even if the probe head 24 is brought from the vertical orientation shown in FIG. 2 to a horizontal orientation (rotation about the axis B) with the aid of the rotary pivot joint 22. In principle, however, the probe head 24 could also have a separate taring transverse to the longitudinal axis 50.

With the aid of the novel probe head 24, the coordinate measuring machine 10 is able to carry out measurements which, beyond a positioning of the probe head with the aid of the rotation axes A,B of the rotary pivot joint 22, require further rotation movements or pivoting movements. Advantageously, the coordinate measuring machine 10 is therefore able to very quickly measure grooves in bores or on shafts, for example, with the aid of the probe head 24. Moreover, the combination of the novel probe head 24 with a rotary pivot joint 22 is very suitable for measuring oblique inner teeth. By virtue of the very compact and light design of the probe head 24, the latter can be used alternatively to other sensors on the rotary pivot joint 22, such that the coordinate measuring machine 10 can use different sensors on a universal change-over interface.

The mechanical set-up of the novel probe head 24 is relatively simple, and the wiring of the probe head 24 is also simple, because the probe head 24 in the preferred exemplary embodiments manages with passive generation of a measuring force. Similarly, with the aid of the respectively resilient couplings between the first and the second probe head part and between the second and the third probe head part, a defined measuring force can be generated when probing a measurement object. The respective measuring force can be very advantageously determined by forming the difference of the sensor values delivered by the sensor elements 54, 100 and 84, 86. By virtue of the low weight of the moved parts of the probe head 24, rotation movements and pivoting movements during, a measurement can be performed very quickly and yet precisely. Moreover, the probe head 24 can also be easily secured on the rotary pivot joint 22 via a rod-shaped extension piece (not shown here), in order in particular to permit a measurement in a very deep bore. This is favored by the compact size and low weight of the probe head 24.

In the preferred exemplary embodiments, the evaluation and control unit has an evaluation and control module 108, which is configured to control the two actuators of the probe head 24 in order to bring one or more styluses 66, 68 to a desired orientation even during a continuous measurement. Since, for each of the two axes of movement, only one rotation angle has to be determined in each case with the aid of the sensor elements 54 and 86 in order to determine the respective deflection of the probe head, the recording of the measured values can take place very quickly.

What is claimed is:

1. A probe head for a coordinate measuring machine for determining measurement point coordinates on a workpiece, the probe head comprising:
   a first probe head part having a first change-over interface which is designed to couple the probe head to the coordinate measuring machine,
   a second probe head part coupled to the first probe head part and rotatable relative to the first probe head part about a first axis,
   a third probe head part coupled to the second probe head part and pivotable relative to the second probe head part about a second axis, wherein the first axis and the second axis do not intersect in space and also do not extend parallel to each other,
   a first electrical drive designed to rotate the second probe head part relative to the first probe head part about the first axis,
   an actuator designed to pivot the third probe head part about the second axis, and
   a push rod coupled to the third probe head part at a lateral distance from the second axis;
   wherein the actuator comprises a second electrical drive and moves the push rod in a longitudinal direction in order to pivot the third probe head part in relation to the second probe head part.

2. The probe head of claim 1, wherein the longitudinal direction extends parallel to the first axis.

3. The probe head of claim 1, wherein the longitudinal direction extends along the first axis.

4. The probe head of claim 1, further comprising a hollow shaft via which the second probe head part is rotatably coupled to the first probe head part, wherein said push rod runs in the hollow shaft.

5. The probe head of claim 1, wherein said push rod comprises a spindle driven by the second electrical drive.

6. The probe head of claim 1, wherein said push rod is coupled to the third probe head part via a spring element.

7. The probe head of claim 6, wherein the spring element comprises a helical spring.

8. The probe head of claim 1, further comprising a first sensor element configured to provide a first sensor value which is representative of a current position of said push rod.

9. The probe head of claim 8, further comprising a drive wheel, with the first electrical drive being designed to set the drive wheel in a rotary movement.

10. The probe head of claim 9, wherein the drive wheel is rigidly coupled to the first probe head part and resiliently coupled to the second probe head part, or vice versa.

11. The probe head of claim 10, further comprising a magnet element, by which the drive wheel is resiliently coupled to the second probe head part or to the first probe head part.

12. The probe head of claim 8, further comprising a second sensor element configured to provide a second sensor value which is representative of a current position of the third probe head part relative to the second probe head part.

13. The probe head of claim 8, further comprising a third sensor element configured to provide a third sensor value which is representative of a rotational position of the second probe head part relative to the first probe head part.

14. The probe head of claim 9, further comprising a drive wheel sensor element configured to provide a drive wheel sensor value representative of a rotational position of the drive wheel.

15. The probe head of claim 1, wherein the third probe head part has a second change-over interface designed for releasably coupling a probe element.

16. The probe head of claim 15, wherein the probe element comprises a stylus.

17. The probe head of claim 1, further comprising a probe element having a base, a probe tip remote from the base, and a center of gravity lying between the base and the probe tip, wherein the center of gravity lies on a path that represents a minimum distance between the first and second axes.

18. The probe head of claim 1, further comprising a probe element having two styluses extending orthogonally with respect to each other, with one of said two styluses can be positioned parallel to the first axis with the aid of the third probe head part.

19. A coordinate measuring machine for determining measurement point coordinates on a workpiece, comprising a workpiece holder for the workpiece, comprising a frame on which a probe head is secured, and comprising an evaluation and control unit designed to bring the probe head to a defined position relative to the workpiece holder and to determine measurement point coordinates on the workpiece as a function of the defined position, wherein the probe head comprises:
   a first probe head part having a first change-over interface which is designed to couple the probe head to the coordinate measuring machine,
   a second probe head part coupled to the first probe head part and rotatable relative to the first probe head part about a first axis,
   a third probe head part coupled to the second probe head part and pivotable relative to the second probe head part about a second axis, wherein the first axis and the second axis do not intersect in space and also do not extend parallel to each other,
   a first actuator designed to pivot the third probe head part about the second axis, and
   a push rod coupled to the third probe head part at a lateral distance from the second axis;
   wherein the first actuator moves the push rod in a longitudinal direction in order to pivot the third probe head part in relation to the second probe head part.

20. A probe head for a coordinate measuring machine for determining measurement point coordinates on a workpiece, the probe head comprising:
   a first probe head part having a first change-over interface which is designed to couple the probe head to the coordinate measuring machine,
   a second probe head part coupled to the first probe head part and rotatable relative to the first probe head part about a first axis,
   a third probe head part coupled to the second probe head part and pivotable relative to the second probe head part about a second axis, wherein the first axis and the second axis do not intersect in space and also do not extend parallel to each other,
   a first actuator designed to pivot the third probe head part about the second axis,
   a push rod coupled to the third probe head part at a lateral distance from the second axis, and
   a hollow shaft via which the second probe head part is rotatably coupled to the first probe head part;
   wherein said push rod runs in the hollow shaft, and wherein the first actuator moves the push rod in a longitudinal direction in order to pivot the third probe head part in relation to the second probe head part.

21. A probe head for a coordinate measuring machine for determining measurement point coordinates on a workpiece, the probe head comprising:
- a first probe head part having a first change-over interface which is designed to couple the probe head to the coordinate measuring machine,
- a second probe head part coupled to the first probe head part and rotatable relative to the first probe head part about a first axis,
- a third probe head part coupled to the second probe head part and pivotable relative to the second probe head part about a second axis, wherein the first axis and the second axis do not intersect in space and also do not extend parallel to each other,
- a first actuator designed to pivot the third probe head part about the second axis, and
- a push rod coupled to the third probe head part via a spring element and at a lateral distance from the second axis;
wherein the first actuator moves the push rod in a longitudinal direction in order to pivot the third probe head part in relation to the second probe head part.

22. A probe head for a coordinate measuring machine for determining measurement point coordinates on a workpiece, the probe head comprising:
- a first probe head part having a first change-over interface which is designed to couple the probe head to the coordinate measuring machine,
- a second probe head part coupled to the first probe head part and rotatable relative to the first probe head part about a first axis,
- a third probe head part coupled to the second probe head part and pivotable relative to the second probe head part about a second axis, wherein the first axis and the second axis do not intersect in space and also do not extend parallel to each other,
- a probe element having a base, a probe tip remote from the base, and a center of gravity lying between the base and the probe tip, wherein the center of gravity lies on a path that represents a minimum distance between the first and second axes,
- a first actuator designed to pivot the third probe head part about the second axis, and
- a push rod coupled to the third probe head part at a lateral distance from the second axis;
wherein the first actuator moves the push rod in a longitudinal direction in order to pivot the third probe head part in relation to the second probe head part.

\* \* \* \* \*